United States Patent
Harris et al.

(10) Patent No.: US 7,022,274 B2
(45) Date of Patent: Apr. 4, 2006

(54) GAS SINTERED CARBON BLOCK AND METHOD

(75) Inventors: S. Dyer Harris, Wilmington, DE (US); Joel T. Shertok, Newark, DE (US); John K. LeSieur, Newark, DE (US)

(73) Assignee: Graver Technologies, LLC., Glasgow, DE (US)

( * ) Notice: Subject to any disclaimer, the term of this patent is extended or adjusted under 35 U.S.C. 154(b) by 72 days.

(21) Appl. No.: 10/722,882

(22) Filed: Nov. 25, 2003

(65) Prior Publication Data

US 2005/0110178 A1    May 26, 2005

(51) Int. Cl.
*C01B 31/00* (2006.01)
*B29C 67/00* (2006.01)
*C04B 33/32* (2006.01)

(52) U.S. Cl. .............. 264/126; 264/29.1; 264/29.6; 264/29.7; 264/125; 264/653

(58) Field of Classification Search ........ 264/109–128, 264/29.1, 29.6, 29.7, 653
See application file for complete search history.

(56) References Cited

U.S. PATENT DOCUMENTS

| | | | |
|---|---|---|---|
| 4,917,835 A * | 4/1990 | Lear et al. ........... | 264/29.1 |
| 5,656,166 A | 8/1997 | Linnersten et al. | |
| 5,730,869 A | 3/1998 | Koppe | |
| 5,804,074 A | 9/1998 | Takiguchi et al. | |
| 5,928,588 A | 7/1999 | Chen et al. | |
| 5,971,752 A | 10/1999 | Hums | |
| 5,976,432 A | 11/1999 | Yang et al. | |
| 5,989,420 A | 11/1999 | Sugimoto | |
| 6,180,015 B1 | 1/2001 | Egawa et al. | |
| 6,231,792 B1 | 5/2001 | Overbeek et al. | |
| 6,365,092 B1 | 4/2002 | Backa et al. | |
| 2003/0029789 A1 | 2/2003 | Patil | |
| 2004/0168974 A1 | 9/2004 | Hughes et al. | |

FOREIGN PATENT DOCUMENTS

| | | |
|---|---|---|
| GB | 901178 | 7/1962 |
| JP | 60-221312 | 11/1985 |
| JP | 6055020 | 3/1994 |
| JP | 7330444 | 12/1995 |
| JP | 8288652 | 11/1996 |
| JP | 11156344 | 6/1999 |
| JP | 2000-026153 | 1/2000 |
| WO | WO 9814265 | 4/1998 |
| WO | WO 9843796 | 10/1998 |

OTHER PUBLICATIONS

Website http://info-center.ccit.arizona.edu/~thermlab/publications/ortega10-02pres.pdft, "Experimental and Computational Heat Transfer in Thermal Management of Electronics", Oct. 7, 2002, 34 pgs.

* cited by examiner

*Primary Examiner*—Stephen J. Lechert, Jr.
(74) *Attorney, Agent, or Firm*—DLA Piper Rudnick Gray Cary US LLP; Thomas W. Ryan

(57) ABSTRACT

The present invention relates to an effective and rapid method and apparatus for sintering carbon filter blocks having a polymeric binder. The method employs direct contact heat transfer by gas molecule to powder particle, as opposed to conduction heat transfer from an external heating source, using commercially available sintered porous metal sheets and cylinders to form the mold and confine the powder, while allowing heated gas to pass uniformly through the mixture.

10 Claims, 7 Drawing Sheets

GAS SINTERED CARBON BLOCK AND METHOD

BACKGROUND OF THE INVENTION

1. Field of the Invention

This invention relates generally to manufacture of carbon filter blocks. More particularly the invention relates to formation of carbon based filter blocks by sintering a mixture of carbon particles with a polymeric binder.

2. Description of Related Art

Porous filter blocks made of carbon for filtering liquids, such as water, are widely used in industries that depend on filtration. The typical shape of such filter blocks, although others are certainly possible, is a hollow cylinder, in which the liquid enters through a center cavity and diffuses outwardly through the porous cylinder. The carbon (as well other ingredients that may be added for specificity) is distributed more or less uniformly through the cylinder by binding it to polymeric particles of various types.

The general process of manufacturing such carbon filter blocks is to prepare a thoroughly mixed powder consisting of carbon particles and the polymer or polymers of interest. The size of the particles and the specific molecular species of the polymer may vary, as well as the relative proportions, according to the required filtration performance desired. The mixture is placed into a mold by manual or automatic filling means, compacted by pressure or vibration, and then heated. The temperature of the mixture must be brought to just that temperature at which the polymer becomes "sticky", but does not otherwise change its properties. This temperature, called in the art the "vicat" temperature, may vary according to the polymeric species. At the vicat, the carbon becomes attached to the surface of the polymer particles, and the polymer particles to each other, so that upon cooling a solid, yet porous block is formed. Precise control of the temperature is critical: too low of a temperature and the polymers will not bind the matrix; too high of a temperature, and the polymers may melt, burn, de-polymerize, or otherwise become unsuited for the desired filtration purpose. Those skilled in the art will recognize that the mixture constitutes a material with a very low conductivity for heat; it is in fact more nearly an insulator. Therefore, the prior art heating and cooling process will be slow, and also difficult to control precisely if done by external heating of the mold.

The most common method of manufacture for sintered carbon block is oven heating the base materials in a mold. The advantage of this method is relative simplicity; the disadvantage is the long process cycle time. This method uses individual steel molds, heated in a furnace to the vicat temperature, then removed and cooled to a point where the block can be removed from the mold. The heating process is slow, typically 30–60 minutes, with a similar cool down time. This time is controlled by the heat transfer rate through the mold structure and then through the carbon-binder mixture. Increasing the furnace temperature to increase the heat transmission rate is limited by the requirement that the binder particles not be damaged, as previously discussed.

A second common prior art method is to use a mold that includes a surrounding jacket containing a heated fluid or gas such as oil, steam, a fluorocarbon, or other hot gases. This method is also limited by the slow rate of heat transfer through the jacket wall into the mold, and then through the poorly conducting mixture. As in the oven method, heating is by conductive heat transfer through a low conductivity material. Process cycle times are about the same as in the oven method, although temperature limits can be controlled more precisely, especially if saturated steam is used. Introducing heat from a hot fluid from all sides of the mold simultaneously offers some improvement in process time.

Another method involves electrical heating. There are at least two approaches using electrical heating. The first simply involves wrapping the mold with a resistive electrical heating coil. As in the oven and the fluid jacket methods, this approach is ultimately limited by the heat transmission times. In addition, there can be some non-uniformity of heating patterned after the geometry of the coils. The second electrical method uses direct heating, whereby a current is applied directly to the mixture via suitable electrodes, and the mixture is heated very rapidly by resistive heating. This method is limited to those mixtures that are electrically conductive, e.g., having a high percentage of carbon. While potentially rapid, process temperature control can be only approximate, and in fact will usually be too high. In addition, short-circuiting through areas of slightly higher conductive particle content can cause internal arcing and possibly ignition of the materials.

Two other less common prior art methods can be mentioned. The first involves the use of inductive heating, whereby energy is transferred from large, suitably designed induction coils surrounding the mold. The other is microwave heating. Inductive heating can be very rapid, but doesn't work well with nominally non-conducting materials. It is also quite expensive to design, construct and maintain. Even so, temperature control and uniformity is a problem. Microwave heating requires that the target material have high hydrogenous content. While the binders are typically hydrocarbons, their response to microwaves varies widely, and in particular are subject to temperature non-uniformity, just as are food items in the home microwave.

There is therefore one object of the invention to provide a simple yet effective method for sintering carbon-binder filter blocks that improves manufacturing time and efficiency while precisely controlling the process temperatures as required.

SUMMARY OF THE INVENTION

In the manufacture of sintered carbon filter blocks of varying shapes, rapid heating and subsequent cooling of the process mixture in its mold is required. There is a minimum goal temperature to enable binding action to occur, limited by a higher temperature where the binder either melts, chars, or otherwise is altered, and the product is useless. The disclosed invention teaches a method for rapidly heating the carbon mixture uniformly to the desired temperature, and subsequently cooling the sintered product prior to removal from the mold. The result is a higher quality product, higher manufacturing throughput, at lower cost.

The invention is specifically described in a process in which a heated gas, which may be air, nitrogen, helium, or other suitable gas depending on the chemistry of the product, is passed directly through a powdered mixture, heating the elemental particles of the product mixture directly to the correct temperature. Subsequent to heat up, cooled gas is passed through in a similar manner to reduce the temperature so that the mixture is rapidly cooled. Also disclosed is a novel mold for use with the described method, such that the hot gas may be introduced in a distributed, uniform fashion, yet allowing for easy removal from the mold, and obtaining a suitably smooth surface on the completed block.

The foregoing objects and advantages are realized by the present invention, and are not intended to be exhaustive or limiting of the possible advantages that can be realized.

Thus, these and other objects and advantages of the invention will be apparent from the description herein, or can be learned from practicing the invention, both as embodied herein or as modified in view of any variation which may be apparent to those skilled in the art. Accordingly, the present invention resides in the novel methods, arrangements, combinations and improvements herein shown and described.

BRIEF DESCRIPTION OF THE DRAWINGS

Specific embodiments of the invention have been chosen for purposes of illustration and description, and are shown in the accompanying drawing, forming a part of the specification wherein.

DETAILED DESCRIPTION OF THE PREFERRED EMBODIMENTS OF THE INVENTION

Figure 1:
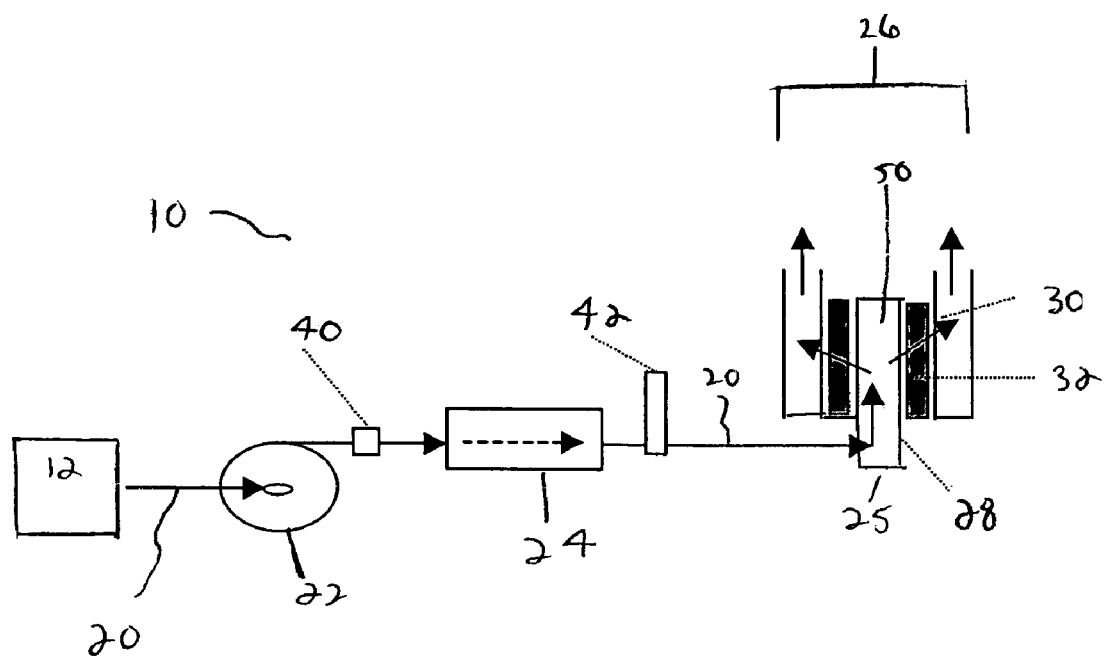
FIG. 1 is a process diagram for the method according to the invention.

Referring now to the drawings, in which like numerals refer to like components or steps, there are disclosed broad aspects of the preferred embodiments of the present invention.

FIG. 1 is a process diagram generally illustrating the key steps in the claimed inventive process 10. In operation of the method 10, a gas 20, which may be air, nitrogen, $CO_2$, helium or other gas suitable to the mixture chemistry, is compressed by compressor 22 and heated by a controlled electric resistance heating element 24 or other suitable means. The choice of gas 20 is determined by the potential and desirability of a chemical interaction between gas 20 and powder components 32. In the preferred embodiment, no interaction is desirable, and none occurs, so that the gas 20 is chosen by economic considerations. Atmospheric air is typically the best, but not the only, choice.

The hot gas 20 enters an inlet plenum 25 attached to the base of the mold 26. The gas 20 is distributed to the inter walls 28 on one side of the mold 26, which must be porous to the gas. In the preferred embodiment of the invention, both the inter 28 and outer walls 30 must be porous. Less preferably, at least one inner 28 and one outer 30 wall are porous. The hot gas 20 must be distributed to flow more or less uniformly through the mixture of the powdered mixture 32 to be sintered. It should be understood that mixture 32 generally comprises carbon particles and a binder, such as a thermoplastic resin. The selection and sizing of the carbon particles and thermoplastic binder, and any additional materials sintered into the resulting carbon block, are left to the practitioner as is or may be known in the art. In the preferred embodiment of the method for forming a filter block having annular shape, heated gas 20 enters the center pin 50, formed by the inter walls 28 of the mold 26 and preferably constructed from a porous sintered metal, passes radially through the mixture 32, and exits through the porous sintered metal outer mold walls 30. The gas 20 therefore enters the mixture 32 uniformly and heats the individual binder particles by direct contact. The gas 20 exits through the outer surface (walls) 30 of the hollow cylindrical block mold 26 into an outlet plenum 34 (see FIGS. 2 & 3) from which it returns via a return line (not shown), to the compressor 22 and then to the inlet plenum 25. In a slightly less preferred embodiment of the inventive method, the gas can be passed through the external wall 30 of the mold 26, through the mixture and into the porous interior walls 28. It is contemplated that for lower cost heating, the gas 20 such as air can be atmospheric air that can be simply exhausted to the atmosphere at the end of the heating process. Process control and monitoring instruments include means for measuring and controlling the gas flow 40, such as through gas flow meter, and means for measuring and controlling the heated air temperature 42, such as through a thermostat. All steps of the inventive method can be automated.

In the preferred embodiment of the disclosed process for making a filter block by direct heat transfer, the gas 20 enters at a pressure determined by the compressor 22, or as regulated from a tank or central source 12. The flow rate is determined preferentially by a digital flow meter 40, measuring directly the gas mass flow rate. However, for simplicity, the flow meter 40 can be a device such as a rotometer with an associated pressure gage for pressure correction, from which mass flow rate of a given gas can be calculated.

The mass flow rate of heating gas should generally be as high as possible, such that the maximum amount of energy can be delivered to the powder mixture in the minimum amount of time. The theoretical equation for the amount of time required is $t=M_b C_b \Delta T_b / q_a C_a \Delta T_a$ where, $M_b$ is the mass of the block powder mixture, $C_b$ is the effective specific heat of the block powder mixture, $q_a$ is the mass rate of flow of the heating gas, and $C_a$ is the specific heat of the heating gas, all in consistent units of measure. For example, assume the block mixture mass=1 lbm, its mean or effective specific heat=0.2 Btu/lbm-F, and the mass flow rate of air as heating gas is 0.01 lbm/sec, with specific heat 0.24 Btu/lbm-F. If the whole is heated from 70 F to 350 F ($\Delta T=280$), then time to heat to 350 F is 83 sec. In practice, several factors intervene to lengthen this time. Direct contact heat transfer is fast, but not infinitely so. Even at the micron particle level a certain amount of time is required for the energy content of molecules of high temperature gas to raise the particle temperature. In addition, as the particles heat up this transfer rate slows, being proportional to the $\Delta T$ between gas and particle. Nonetheless, the transfer rate is many times that of a pure conduction process. More noticeably in practice, some portion of the energy content of the heated gas goes to heat up the metal in the mold and piping components, and therefore initially passes through the mixture at lower than assumed temperature. Those skilled in the art will appreciate that several design improvements are possible that mitigate these effects, such as increased gas mass flow rate, insulation, and preheating of components and mixture, all of which are encompassed by the inventive method.

The control temperature is a function of the properties of the powder mixture 32, wherein some binder polymers may have a vicat temperature lower than others. Generally, these temperatures range from 275° F. to 400° F. The gas heater system 24 may be easily adjusted manually or automatically to control the temperature of the gas going to the mold to precisely the desired temperature. Because the viscosity of most gases increases with temperature (as opposed to liquids, whose viscosity generally decreases), the required pressure to drive a specific mass flow through the mold will change somewhat as the gas and system heat up. The flow controller meter 40 may be such as to auto compensate for this effect. In practice, the process is quite stable and to some degree self-compensating, so that precise control is not necessary.

Figure 6:
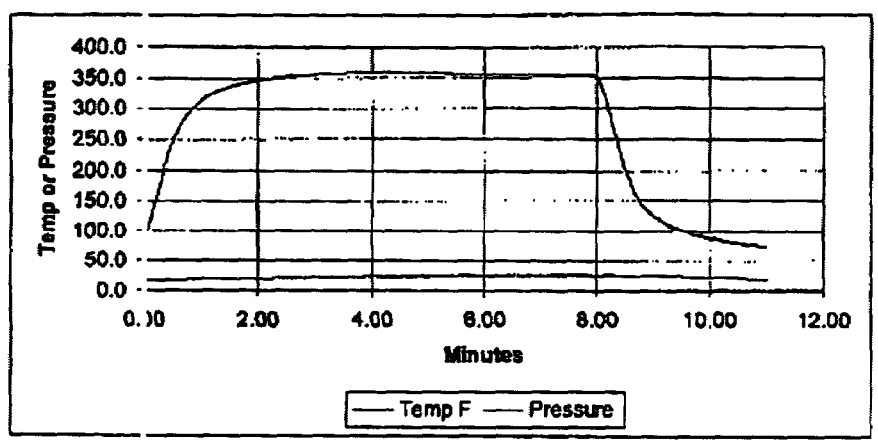
FIG. 6 is a graph showing recorded temperature data for typical operation using a mold according to the invention.

It has been found that operation of the mold at target temperature for several minutes ensures that all polymer particles have reached vicat and become binders as desired. FIG. 6, shows recorded temperature data for typical operation, where the system was held at temperature for about six minutes after heat up.

The temperature measured was from a thermocouple placed just downstream of the gas heater 24. A similar data record for an externally heated process would have a timeline on the order of 30 to 60 minutes.

Upon completing the heating cycle, the gas heater 24 can be simply turned off, and the gas supplied now enters at its ambient temperature cooling the sintered block 60 and system down. As before, the block 60 is being cooled by direct heat exchange, but in reverse. The cool down time required is given theoretically by the equation above, but in practice a longer time is required because the metal components of the system are also being cooled. Those skilled in the art will recognize various means and methods that would hasten the cooling phase. In addition to those previously mentioned, one could also introduce a chilled gas from a separate source, or water cooling once the internal temperature dropped sufficiently. Removal from the mold 26 can be done as soon as the block material 60 has cooled sufficiently below its binder vicat temperature to give it structural integrity.

Figure 2:
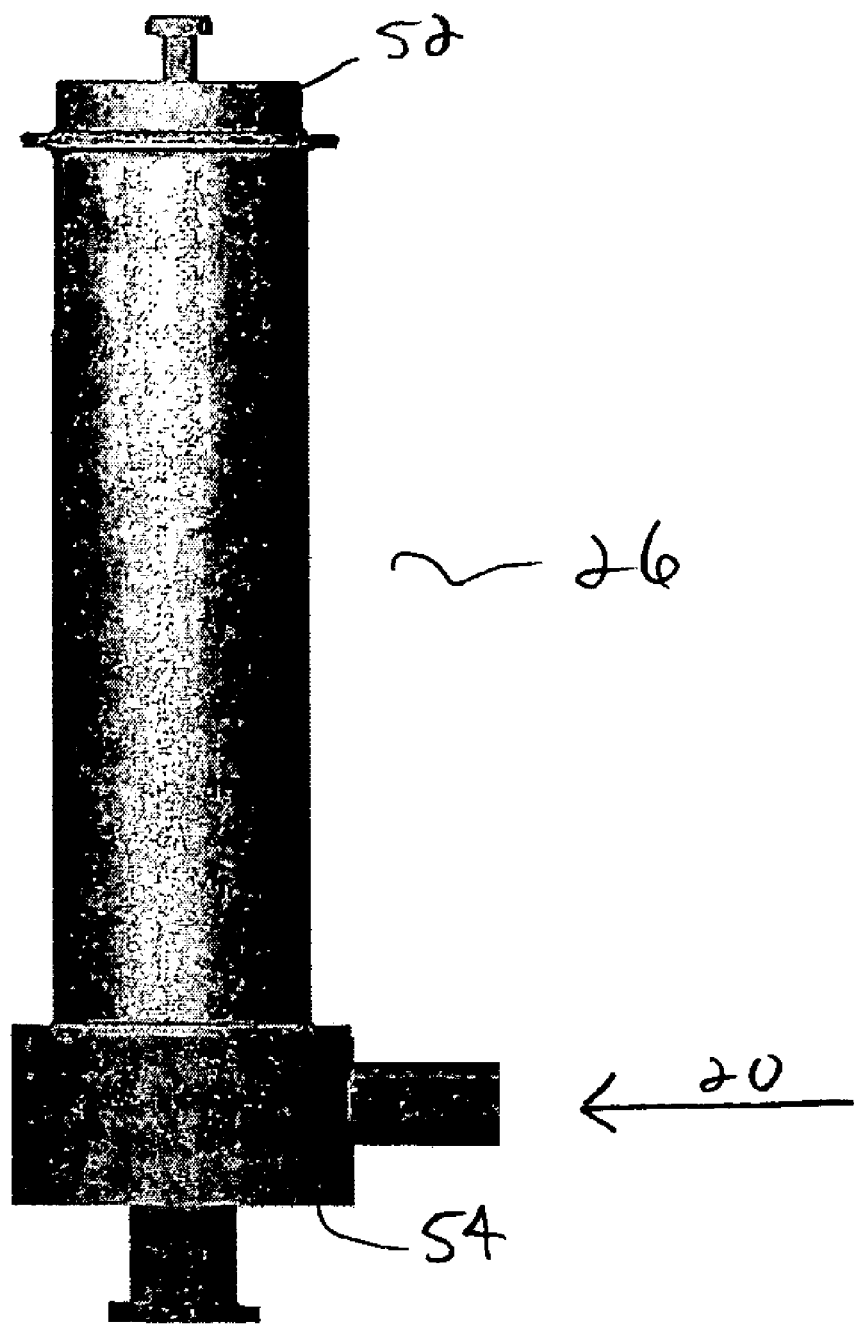
FIG. 2 is an external plan view of a mold according to the invention.
Figure 3:
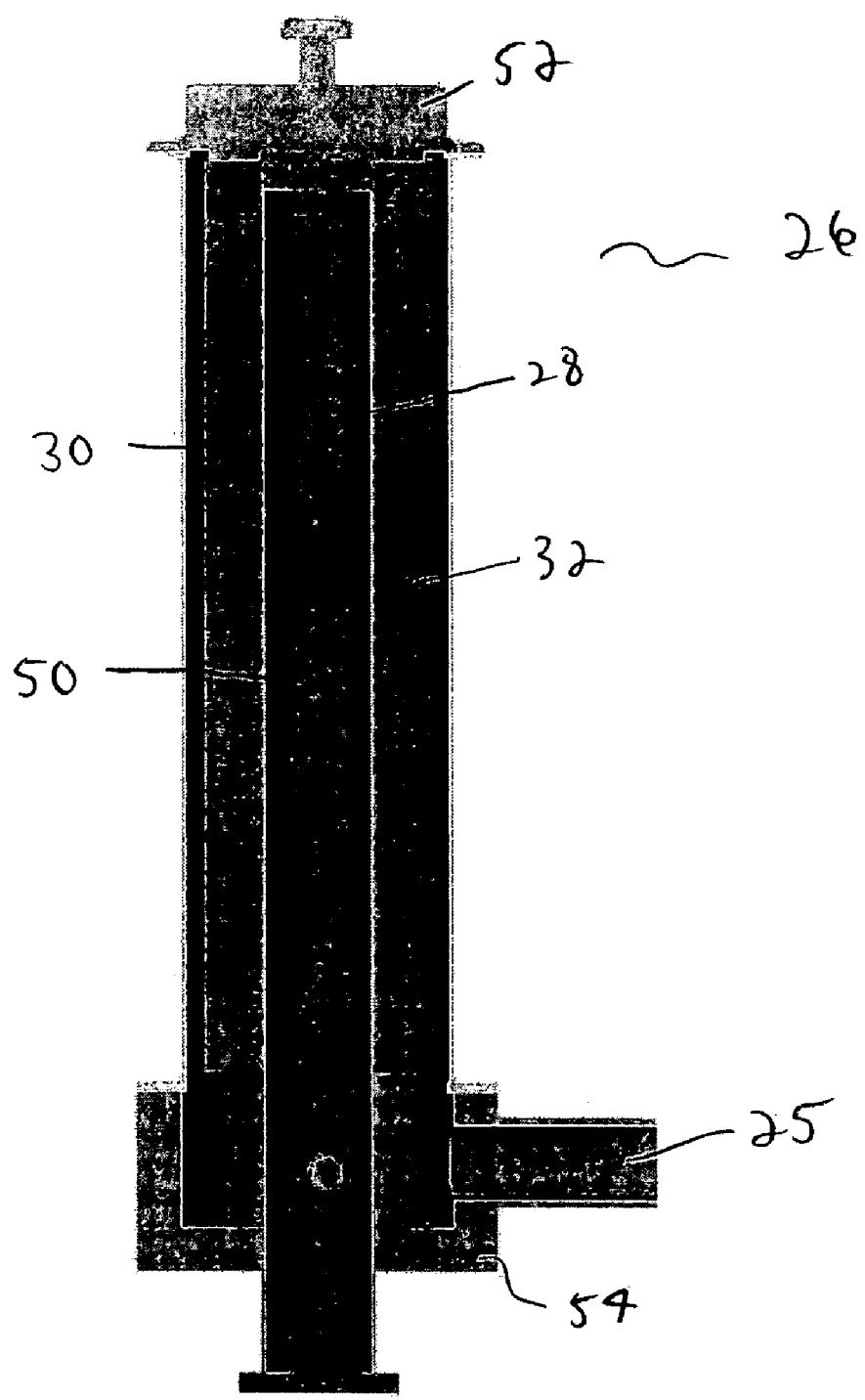
FIG. 3 is a cross sectional view of a mold for direct contact heating according to the invention.

FIG. 2 shows an outside perspective of a mold 26 suited for making a filter block with a hollow cylindrical geometry while FIG. 3 is a cross section of a mold 26 suited for the same. As previously detailed, the mold 26 is filled with the powdered mixture 32 with the center pin 50 in place, and the top cap 52 placed on the mold 26. While the powdered mixture 32 to be sintered is contained between the porous inner walls 28 and the porous metal outer walls 30, the top 52 and bottom caps 54 form top and bottom walls of the mold and are not porous, thus constraining the hot gas passing radially through the powder mixture. All joints are sealed to prevent leakage at the gas pressures used in the method.

The hot gas enters the inner cylinder walls 28 through holes (not shown) exposed in the lower plenum 25. The porous metal cylinders comprising the inner 28 and outer 30 mold walls are typically made of stainless steel or titanium sintered metal such as that made by Graver Technologies (Glasgow, Del.), Mott Corporation (Farmington, Conn.), or GKN Sinter Metals (Auburn Hills, Mich.). The porosity of the mold may vary from 0.5 microns to 10 microns, with the most preferred embodiment being 2 microns. Selection of porosity is dictated by the particle size of the powders being processed such that it is neither penetrated by the particles nor blinded, and also by the desired resistance to gas flow (pressure drop) in the process. Pressure may range from less than 1 bar (14.5 psig) to 10 bar (145 psig), with the most preferred embodiment being a pressure in the range of 1–2 bar.

Figure 4:
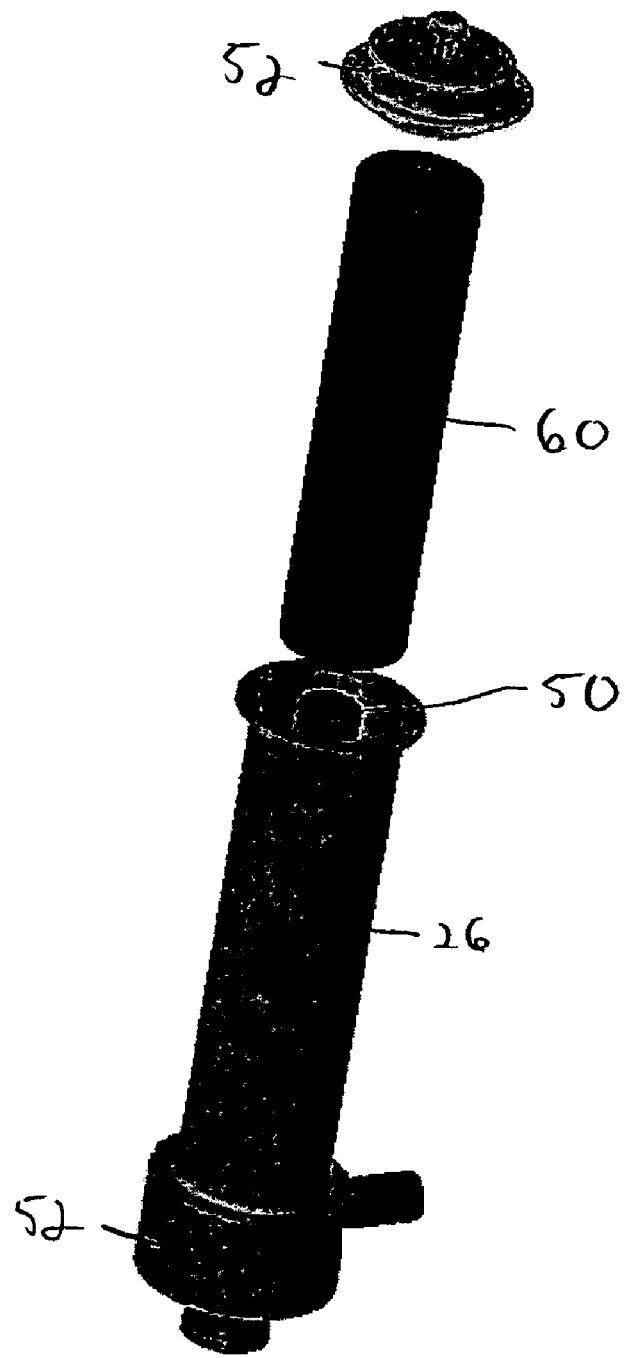
FIG. 4 is a partially exploded view of a mold, with the carbon block extracted, according to the invention.

FIG. 4 is an exploded view of a mold 26 suited for making a filter block with a hollow cylindrical geometry, showing the sintered filter block 60 ejected from the mold 26. Alternatively, the block can be removed from the bottom by removal of the bottom inlet plenum 25 and pin 50. Another way of removing the filter block 60 is through partial extraction of the center pin 50 through the bottom cap 54, followed by reinsertion with the top cap 52 removed, as shown in FIG. 4, such that the friction of the pin 50 against the sintered block 60 surface pushes the block 60 out of the mold. Gripping knobs (not shown) as appropriate for automatic removal machinery can provided.

Figure 5A:
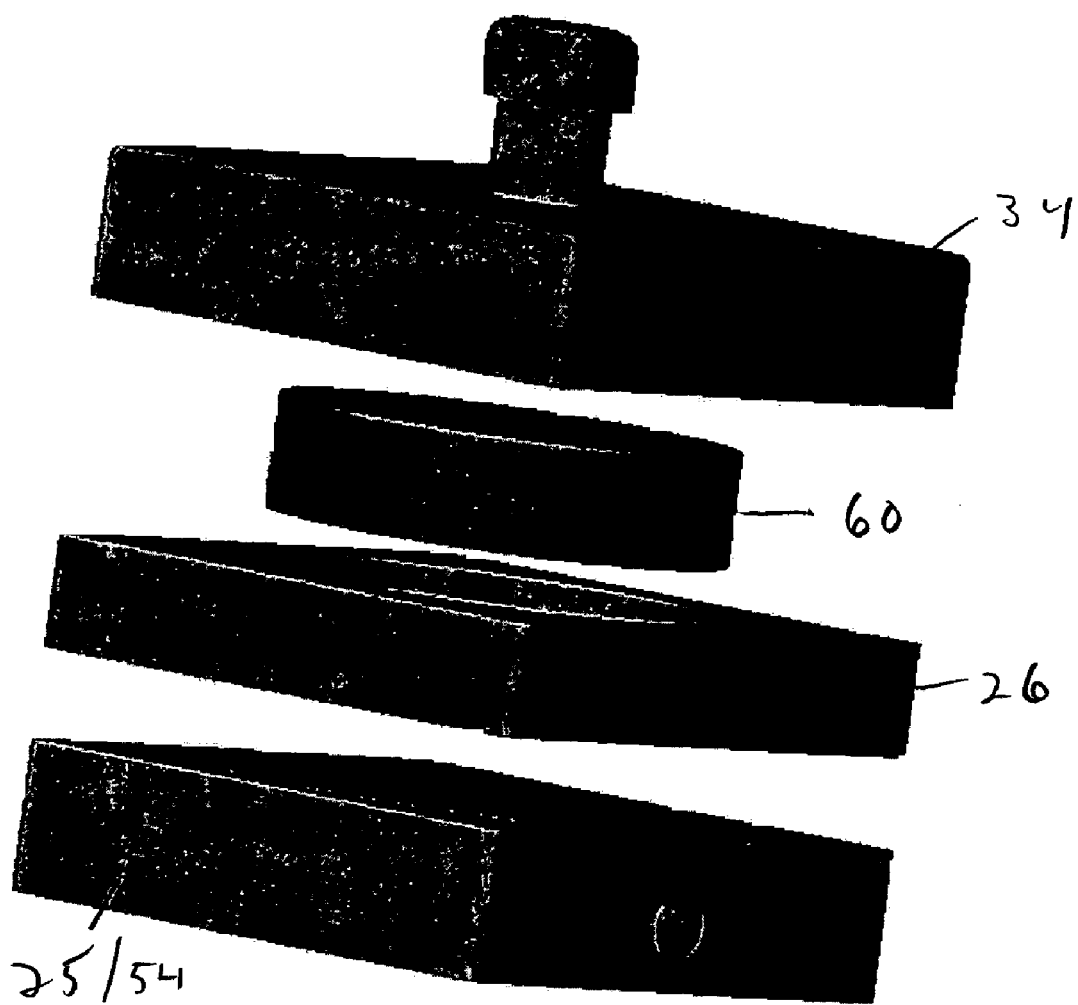
FIG. 5A is a partially exploded view of an alternative, disc shaped mold, with the carbon block extracted, according to the invention.
Figure 5B:
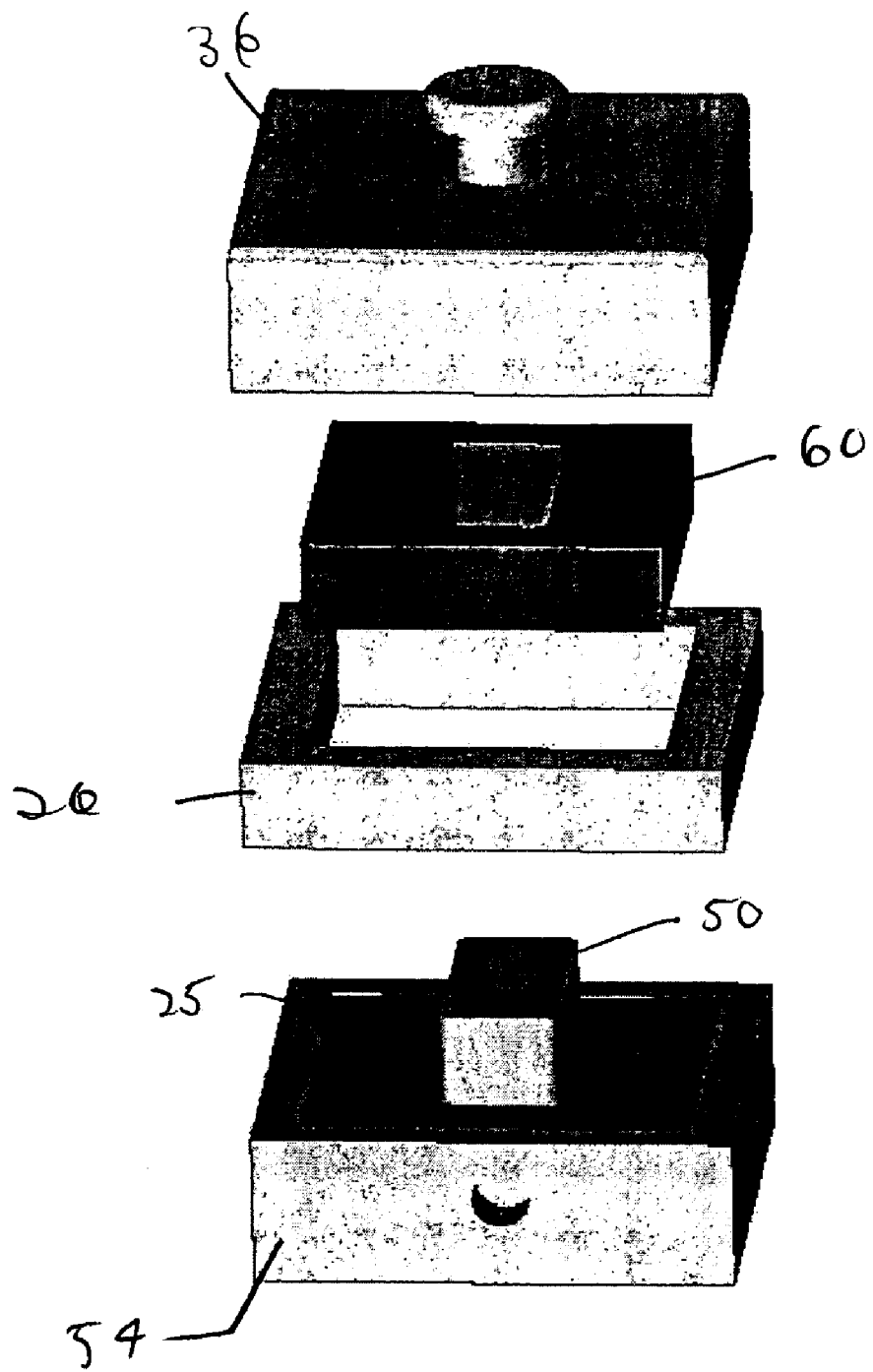
FIG. 5B is a partially exploded view of an alternative, rectangle shaped mold, with the carbon block extracted, according to the invention.

Those skilled in the art will recognize that other filter block shapes can be made by this method by suitable design of the mold such as molds with porous boundaries for making disk and rectangular filter blocks by the methods of this invention as shown in FIGS. 5A and 5B, respectively.

In addition to the structures, sequences, and uses immediately described above, it will be apparent to those skilled in the art that other modifications and variations can be made to the method of the instant invention without diverging from the scope, spirit, or teaching of the invention. Therefore, it is the intention of the inventors that the description of instant invention should be considered illustrative and the invention is to be limited only as specified in the claims and equivalents thereto.

We claim:

1. A method for producing a sintered carbon block by direct heat transfer, the method comprising:
    a) selecting a mixture comprising least one polymer and carbon particles;
    b) providing a mold defined by interior and exterior walls, wherein at least one interior wall and at least one exterior wall is permeable to a heated gas;
    c) introducing said mixture into said mold between said interior and exterior walls;
    b) providing a gas;
    c) heating said gas to an elevated temperature, said temperature being determined by the composition of the polymer and carbon mixture whereby the polymer softens without melting;
    d) introducing said heated gas into the mold;
    e) passing said heated gas through said mixture between said interior and exterior walls; and
    d) heating said mixture by direct heat transfer at said temperature for a predetermined time period sufficient to allow said mixture to sinter,
   whereby a sintered carbon block is formed.

2. The method of claim 1, wherein the method further comprises the step of compressing the gas prior to heating the gas.

3. The method of claim 1, wherein the gas is chemically non-reactive with said polymer and carbon mixture.

4. The method of claim 1, wherein the gas is selected from the group comprising carbon dioxide ($CO_2$), nitrogen ($N_2$), helium, or air.

5. The method of claim 1, wherein the heated gas passes through at least one permeable interior wall of said mold, through said polymer and carbon mixture, and out through at least one permeable exterior wall.

6. The method of claim 1, wherein said gas is recovered and recycled upon passing through said mixture.

7. The method of claim 1, further comprising the step of cooling said sintered carbon block, wherein a gas is cooled, introduced into the mold by way of at least one permeable interior wall, passes through said sintered carbon block and is exhausted by way of at least one permeable exterior wall.

8. The method of claim 1, wherein the mold is formed of a porous and sintered metal.

9. The method of claim 1 wherein the amount of time the mixture is sintered, in the absence of heat loss, is governed by the equation:

$t = M_b C_b \Delta T_b / q_a C_a \Delta T_a$, wherein $M_b$ is the mass of the block powder mixture;
$C_b$ is the effective specific heat of the block powder mixture;
$q_a$ is the mass rate of flow of the heating gas; and
$C_a$ is the specific heat of the heated gas.

10. The method of claim 1 wherein the gas is heated to a temperature from approximately 275° F. to approximately 400° F.

* * * * *